US008648841B2

(12) United States Patent
Chang

(10) Patent No.: US 8,648,841 B2

(45) Date of Patent: Feb. 11, 2014

(54) SCAN-LINE DRIVING DEVICE OF LIQUID CRYSTAL DISPLAY APPARATUS AND DRIVING METHOD THEREOF

(75) Inventor: Meng-Sheng Chang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 173 days.

(21) Appl. No.: 13/248,115

(22) Filed: Sep. 29, 2011

(65) Prior Publication Data

US 2012/0262497 A1 Oct. 18, 2012

(30) Foreign Application Priority Data

Apr. 12, 2011 (TW) ............................ 100112700 A

(51) Int. Cl.

*G06F 3/038* (2013.01)
*G09G 5/00* (2006.01)
*G09G 3/36* (2006.01)

(52) U.S. Cl.

USPC .............. 345/204; 345/211; 345/213; 345/94

(58) Field of Classification Search

USPC ......... 345/204–212, 690, 55, 84, 94, 99, 100, 345/173, 82, 76, 89, 92, 98, 214, 102, 75.2; 363/65, 147; 327/218, 536, 157, 172; 315/169.4

See application file for complete search history.

(56) References Cited

U.S. PATENT DOCUMENTS

| | | | | |
|---|---|---|---|---|
| 7,027,024 | B2 | 4/2006 | Yanagi et al. | |
| 7,528,807 | B2 * | 5/2009 | Kim et al. | 345/76 |
| 7,696,969 | B2 * | 4/2010 | Yanagi et al. | 345/94 |
| 7,898,514 | B2 * | 3/2011 | Kim | 345/92 |
| 8,106,901 | B2 * | 1/2012 | Li et al. | 345/211 |
| 8,325,126 | B2 * | 12/2012 | Cheng et al. | 345/99 |
| 8,344,974 | B2 * | 1/2013 | Kim et al. | 345/82 |
| 8,432,364 | B2 * | 4/2013 | Krah | 345/173 |
| 2002/0063672 | A1 * | 5/2002 | Stevens | 345/89 |
| 2006/0279970 | A1 * | 12/2006 | Kernahan | 363/65 |
| 2009/0201280 | A1 * | 8/2009 | Huang | 345/211 |
| 2011/0012891 | A1 | 1/2011 | Cheng et al. | |
| 2011/0084894 | A1 | 4/2011 | Siao et al. | |

FOREIGN PATENT DOCUMENTS

| | | |
|---|---|---|
| JP | 08336063 A * | 12/1996 |
| TW | 200933568 | 8/2009 |
| TW | 201113857 | 4/2011 |

* cited by examiner

*Primary Examiner* — Dwayne Bost
*Assistant Examiner* — Darlene M Ritchie
(74) *Attorney, Agent, or Firm* — WPAT, PC; Justin King

(57) ABSTRACT

A scan-line driving device for a LCD apparatus is provided. The scan-line driving device comprises a PWM signal generating circuit, two impedances with different resistance values, a capacitor and two scan drivers. The PWM signal generating circuit outputs a PWM signal with two potentials and a predetermined duty cycle. A terminal of the capacitor is electrically coupled to a ground potential, and the other terminal of the capacitor receives the PWM signal. Each of the scan drivers comprises a core circuit and a transistor. A source/drain terminal of each transistor is electrically coupled to a PWM signal input terminal of a corresponding core circuit and the other terminal of the capacitor, the other source/drain terminal of each transistor is electrically coupled to the ground potential through a corresponding one of the impedances, and the gate terminal of each transistor receives a turn-on control signal.

7 Claims, 6 Drawing Sheets

SCAN-LINE DRIVING DEVICE OF LIQUID CRYSTAL DISPLAY APPARATUS AND DRIVING METHOD THEREOF

TECHNICAL FIELD

The present invention relates to the display field, and more particularly to a scan-line driving device for a liquid crystal display (LCD) apparatus and a driving method thereof.

BACKGROUND

FIG. 1 is a schematic view of a conventional LCD apparatus. Referring to FIG. 1, the conventional LCD apparatus comprises a display panel 110, a printed circuit board 120 and a flexible printed circuit board 130. The display panel 110 has a display region 112 in which a plurality of pixels (not shown) and a plurality of scan lines are formed. Furthermore, a plurality of scan drivers (for example, three scan drivers labeled by 114, 116 and 118 are shown herein) are disposed in an outer frame (not labeled) of the display panel 110, so that the scan drivers can output scan pulses (not labeled, and it will be described later) to the scan lines in the display region 112 to turn on the corresponding pixels and load display data respectively.

The printed circuit board 120 comprises a shading signal generating circuit 122, a power supplying circuit 124 and a time-sequence control circuit 126. The shading signal generating circuit 122, the power supplying circuit 124 and the time-sequence control circuit 126 are configured for generating a shading signal VGHM, a logic low potential VGL and an output enable signal OE for each of the scan drivers. The shading signal VGHM, the logic low potential VGL and the output enable signal OE are all transmitted to the scan driver 118 through the flexible printed circuit board 130, then the scan driver 118 transmits the received shading signal VGHM, the received logic low potential VGL and the received output enable signal OE to the scan driver 116, and finally the scan driver 116 transmits the received shading signal VGHM, the received logic low potential VGL and the received output enable signal OE to the scan driver 114. After each of the scan drivers receives the shading signal VGHM, the logic low potential VGL and the output enable signal OE, each of the scan drivers generates the needed scan pulses according to the received shading signal VGHM, the received logic low potential VGL and the received output enable signal OE.

FIG. 2 is a circuit schematic view of the shading signal generating circuit shown in FIG. 1. Referring to FIG. 2, the shading signal generating circuit 122 comprises a positive-charge pump 202, an inverter 204, a P-type transistor 206, an N-type transistor 208, a resistor 210 and a capacitor 212. A terminal of the resistor 210 and a terminal of the capacitor 212 are electrically coupled to the ground potential GND. In addition, the positive-charge pump 202 is configured for providing a logic high potential VGH. An input terminal of the inverter 204 is configured for receiving a duty-cycle control signal CTL, and a node Q where the P-type transistor 206, the N-type transistor 208 and the capacitor 212 are coupled to each other is configured for outputting the shading signal VGHM. FIG. 3 is a schematic view for showing waves of the duty-cycle control signal and the shading signal shown in FIG. 2. Referring to FIGS. 2 and 3, when the duty-cycle control signal CTL is at the high potential, the P-type transistor 206 is turned on. Therefore, the positive-charge pump 202 can charge the capacitor 212 through the P-type transistor 206, so as to pull up the potential at the node Q to the logic high potential VGH. When the duty-cycle control signal CTL is at the low potential, the N-type transistor 208 is turned on. Therefore, the capacitor 212 is electrically coupled to the ground potential GND through the N-type transistor 208 and the resistor 210 to discharge the charges of the capacitor 212, so that the potential at the node Q is gradually reduced. Therefore, the shading signal VGHM is formed.

FIG. 4 is a schematic view for showing a time-sequence relation between a scan pulse generated by the scan drivers and the output enable signal. Referring to FIG. 4, the scan pulse GP is formed according to the shading signal VGHM, the logic low potential VGL and the output enable signal OE, and the output enable signal OE is configured for compulsorily pulling down the potential of the scan pulse GP to the logic low potential VGL. Therefore, it can use the shaded scan pulse GP to drive the scan lines of the display panel 110, so as to improve the image flicker caused by the feed-through effect.

However, since the scan drivers are disposed in different positions of the display panel 110, the signal-transmitting paths for transmitting the output enable signal OE to the scan drivers are different from each other. Therefore, the scan drivers will receive the output enable signal OE with different delay degrees, so that the scan pulses generated by the scan drivers are pulled down to different potentials respectively before they are compulsorily pulled down to the logic low potential VGL. FIG. 5 is a schematic view for showing three different scan pulses. Referring to FIG. 5, a scan pulse G1 is generated by the scan driver 118, a scan pulse G2 is generated by the scan driver 116, and a scan pulse G3 is generated by the scan driver 114. When the scan driver 118 receives the output enable signal OE, the output enable signal OE is delayed with a minimum degree. Thus, the scan pulse G1 generated by the scan driver 118 will be compulsorily pulled down to the logic low potential VGL by the output enable signal OE before the scan pulse G1 is pulled down to 19V. On the contrary, when the scan driver 114 receives the output enable signal OE, the output enable signal OE is delayed with the maximum degree. Thus, the scan pulse G3 generated by the scan driver 114 will be compulsorily pulled down to the logic low potential VGL by the output enable signal OE when the scan pulse G3 is pulled down to 15V.

Since the scan pulses generated by the scan drivers are pulled down to different potentials before they are compulsorily pulled down to the logic low potential VGL, it does not favor the improvement of the image flicker.

SUMMARY

The present invention relates to a scan-line driving device for a LCD apparatus. The scan-line driving device comprises a plurality of scan drivers, and the scan pulses generated by the scan drivers may be pulled down to the same potential before they are compulsorily pulled down to a logic low potential by an output enable signal.

The present invention provides a scan-line driving device for a LCD (liquid crystal display) apparatus. The scan-line driving device comprises a PWM signal generating circuit, a first impedance, a second impedance, a capacitor, a first scan driver and a second scan driver. The PWM signal generating circuit is configured for outputting a PWM (pulse-width modulation) signal with a first potential and a second potential, and the PWM signal further has a predetermined duty cycle. The first impedance has a first terminal and a second terminal. The second impedance has a first terminal and a second terminal. The resistance value of the second impedance is different from that of the first impedance. The first terminal of the second impedance and the first terminal of the first impedance are electrically coupled to a ground potential. The capacitor has a first terminal and a second terminal, and the first terminal of the capacitor is electrically coupled to the ground potential. The first scan driver comprises a first core circuit and a first transistor. The first core circuit has a first PWM signal input terminal, and the first transistor has a first source/drain terminal, a second source/drain terminal and a gate terminal. The first source/drain terminal of the first transistor is electrically coupled to the first PWM signal input terminal and the second terminal of the capacitor, the second source/drain terminal of the first transistor is electrically coupled to the second terminal of the first impedance, and the gate terminal of the first transistor is configured for receiving a turn-on control signal. The second scan driver comprises a second core circuit and a second transistor. The second core circuit having a second PWM signal input terminal, the second transistor has a first source/drain terminal, a second source/drain terminal and a gate terminal. The first source/drain terminal of the second transistor is electrically coupled to the second PWM signal input terminal and the second terminal of the capacitor, the second source/drain terminal of the second transistor is electrically coupled to the second terminal of the second impedance, and the gate terminal of the second transistor is configured for receiving the turn-on control signal.

The present invention also provides another scan-line driving device for a LCD apparatus. The scan-line driving device comprises a PWM signal generating circuit, a first impedance, a second impedance, a first capacitor, a second capacitor, a first scan driver and a second scan driver. The PWM signal generating circuit is configured for outputting a PWM signal with a first potential and a second potential, and the PWM signal further has a predetermined duty cycle. The first impedance has a first terminal and a second terminal. The second impedance has a first terminal and a second terminal. The resistance value of the second impedance is different from the resistance value of the first impedance. The first terminal of the second impedance and the first terminal of the first impedance are electrically coupled to a ground potential. The first capacitor has a first terminal and a second terminal, and the first terminal of the first capacitor is electrically coupled to the ground potential. The second capacitor has a first terminal and a second terminal, and the first terminal of the second capacitor is electrically coupled to the ground potential. The first scan driver comprises a first core circuit and a first transistor, and the first core circuit has a first PWM signal input terminal, and the first transistor has a first source/drain terminal, a second source/drain terminal and a gate terminal. The first source/drain terminal of the first transistor is electrically coupled to the first PWM signal input terminal and the second terminal of the first capacitor, the second source/drain terminal of the first transistor is electrically coupled to the second terminal of the first impedance, and the gate terminal of the first transistor is configured for receiving a turn-on control signal. The second scan driver comprises a second core circuit and a second transistor. The second core circuit has a second PWM signal input terminal, and the second transistor has a first source/drain terminal, a second source/drain terminal and a gate terminal. The first source/drain terminal of the second transistor is electrically coupled to the second PWM signal input terminal and the second terminal of the second capacitor, the second source/drain terminal of the second transistor is electrically coupled to the second terminal of the second impedance, and the gate terminal of the second transistor is configured for receiving the turn-on control signal.

In an exemplary embodiment of the present invention, the PWM signal generating circuit comprises a P-type transistor and a N-type transistor. The P-type transistor has a first source/drain terminal, a second source/drain terminal and a gate terminal. The first source/drain terminal of the P-type transistor is electrically coupled to a positive-charge pump, and the gate terminal of the P-type transistor is configured for receiving a duty-cycle control signal. The N-type transistor has a first source/drain terminal, a second source/drain terminal and a gate terminal. The first source/drain terminal of the N-type transistor is electrically coupled to a negative-charge pump, the second source/drain terminal of the N-type transistor is electrically coupled to the second source/drain terminal of the P-type transistor, and the gate terminal of the N-type transistor is configured for receiving the duty-cycle control signal.

In an exemplary embodiment of the present invention, the PWM signal generating circuit further comprises an inverter. The inverter is electrically coupled between the gate terminal of the P-type transistor and the duty-cycle control signal and between the gate terminal of the N-type transistor and the duty-cycle control signal. The inverter has an input terminal and an output terminal. The input terminal of the inverter is configured for receiving the duty-cycle control signal, and the output terminal of the inverter is configured for outputting an inverted signal of the duty-cycle control signal.

In an exemplary embodiment of the present invention, the first potential is larger than the second potential. The duty-cycle control signal and the turn-on control signal are a first pulse signal and a second pulse signal respectively. The first pulse signal and the second pulse signal have the same frequency. The initiate time of each pulse of the second pulse signal is behind the initiate time of a corresponding pulse of the first pulse signal, and the end time of each pulse of the second pulse signal is the same as the end time of a corresponding pulse of the first pulse signal.

In an exemplary embodiment of the present invention, the first transistor and the second transistor are N-type transistors or P-type transistors.

The present invention adds a transistor to each of the scan drivers. A source/drain terminal of a transistor is electrically coupled to the PWM signal input terminal of the core circuit of a corresponding one of the scan drivers and is electrically coupled to the ground potential through an external capacitor, and the other source/drain terminal of the transistor is electrically coupled to the ground potential through an external resistor. In addition, the present invention further provides a PWM signal with a logic high potential and a logic low potential to the node where an external capacitor and a corresponding transistor are coupled to each other, and the invention uses a turn-on control signal to control the on/off state of each transistor, so as to perform a shading operation on the PWM signals received by the scan drivers respectively. Therefore, as long as the present invention can suitably define the resistance values of the external resistors according to the delay degree of the output enable signal, the present invention can alter the discharging rate of the external capacitors. Thus, the scan pulses generated by the scan drivers may be pulled down to the same potential before they are compulsorily pulled down to the logic low potential VGL by the output enable signal.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
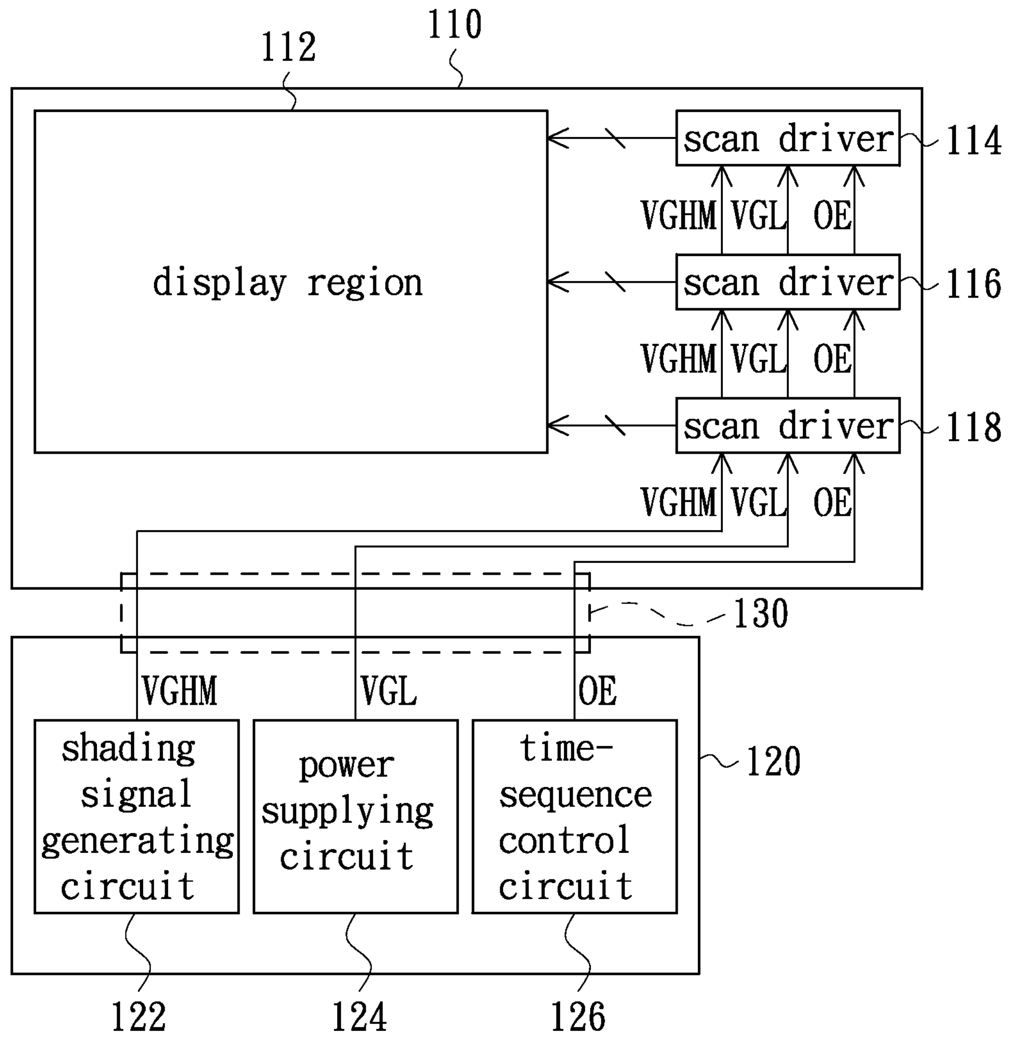
FIG. 1 (Prior Art)
FIG. 1 is a schematic view of a conventional LCD apparatus.
Figure 2:
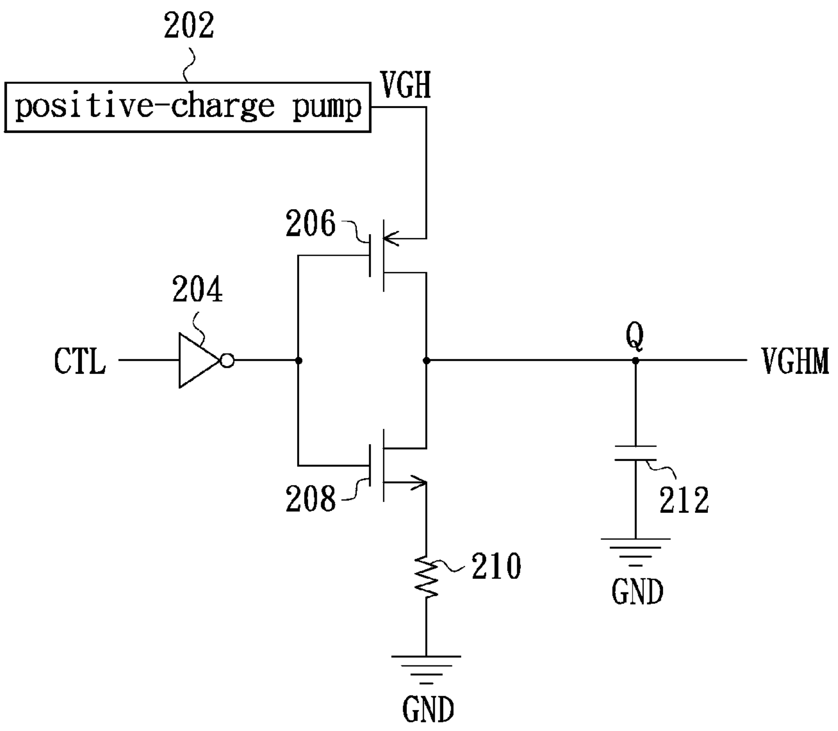
FIG. 2 (Prior Art)
FIG. 2 is a circuit schematic view of a shading signal generating circuit shown in FIG. 1.
Figure 3:
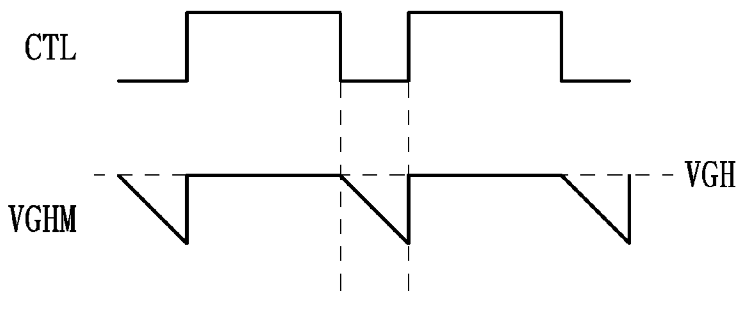
FIG. 3 (Prior Art)
FIG. 3 is a wave schematic view of a duty-cycle control signal and a shading signal shown in FIG. 2.
Figure 4:
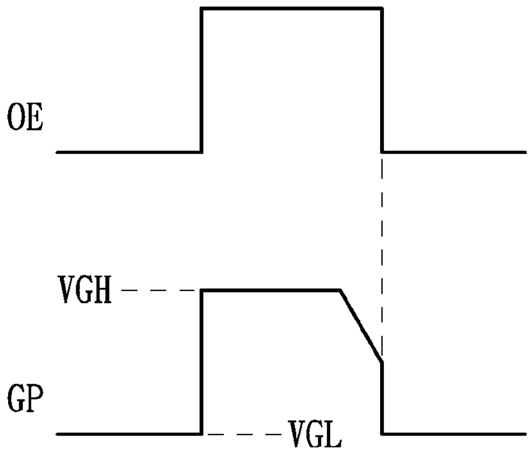
FIG. 4 (Prior Art)
FIG. 4 is a schematic view for showing a time-sequence relation between a scan pulse and an output enable signal.
Figure 5:
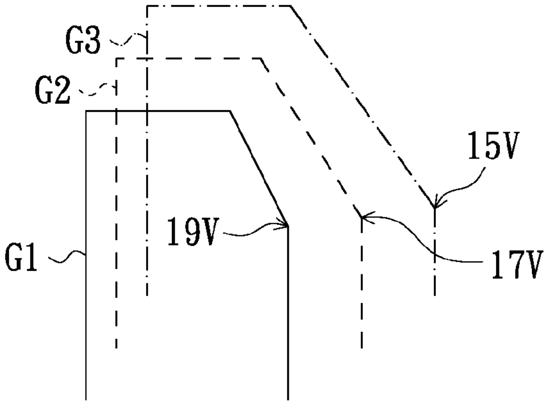
FIG. 5 (Prior Art)
FIG. 5 is a schematic view for showing three different scan pulses.
Figure 6:
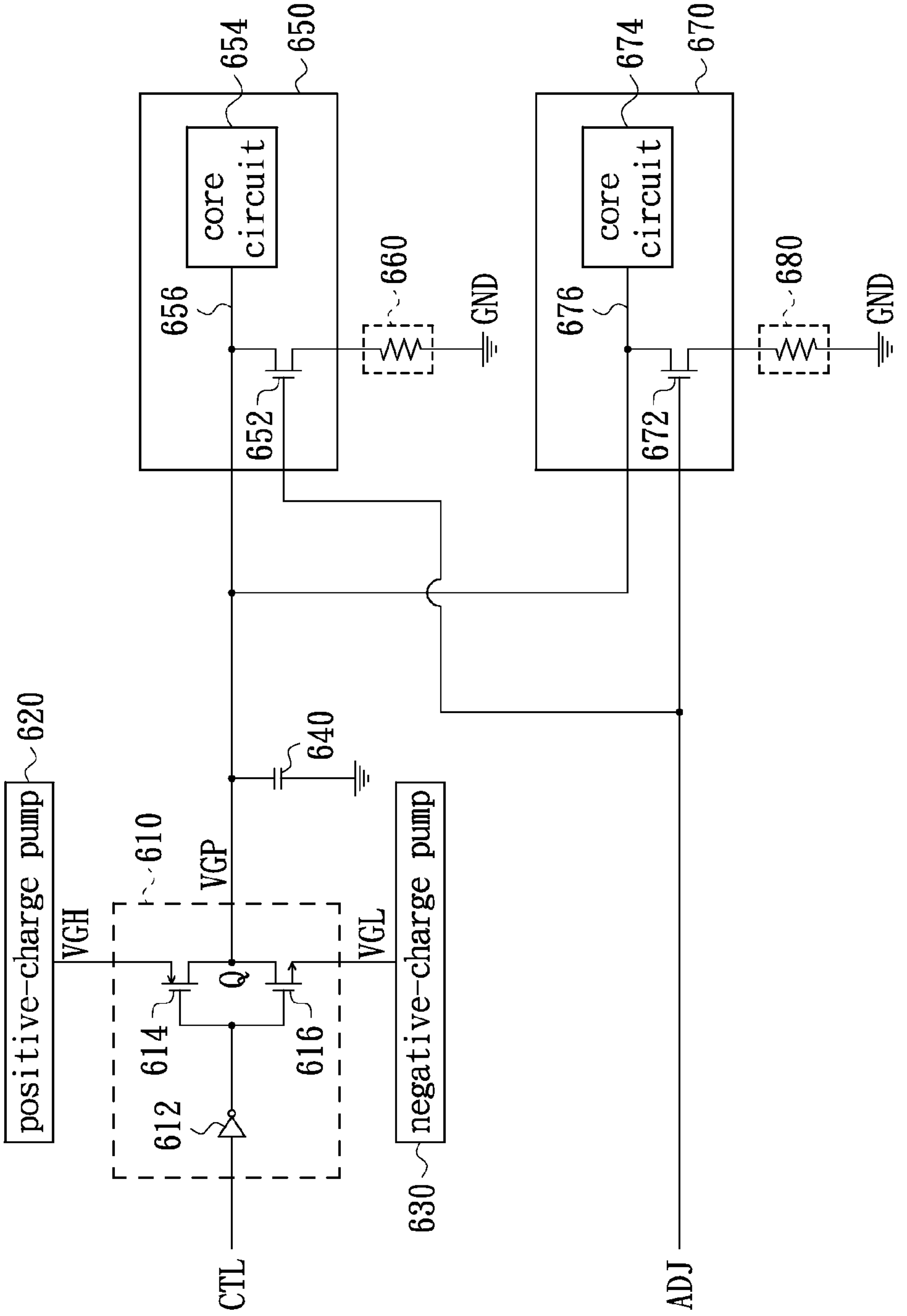
FIG. 6 is a schematic view of a scan-line driving device in accordance with an exemplary embodiment of the present invention.

FIG. 6 is a schematic view of a scan-line driving device in accordance with a first exemplary embodiment of the present invention. The scan-line driving device is suitable for a LCD apparatus. Referring to FIG. 6, the scan-line driving device comprises a PWM (pulse-width modulation) signal generating circuit 610, a capacitor 640, a scan driver 650, an impedance 660, a scan driver 670 and an impedance 680. The PWM signal generating circuit 610 is configured for outputting a PWM signal VGP. A terminal of the capacitor 640 is configured for receiving the PWM signal VGP, and the other terminal of the capacitor 640 is electrically coupled to a ground potential GND. The scan driver 650 comprises a transistor 652 and a core circuit 654, and the core circuit 654 has a PWM signal input terminal 656 for receiving the PWM signal VGP. A source/drain terminal of the transistor 652 is electrically coupled to the PWM signal input terminal 656 and a terminal of the capacitor 640, the other source/drain terminal of the transistor 652 is electrically coupled to the ground potential GND through the impedance 660, and the gate terminal of the transistor 652 is configured for receiving an turn-on control signal ADJ.

The scan driver 670 also comprises a transistor 672 and a core circuit 674, and the core circuit 674 has a PWM signal input terminal 676 for receiving the PWM signal VGP. A source/drain terminal of the transistor 672 is electrically coupled to the PWM signal input terminal 676 and a terminal of the capacitor 640, the other source/drain terminal of the transistor 672 is electrically coupled to the ground potential GND through the impedance 680, and the gate terminal of the transistor 672 is also configured for receiving the turn-on control signal ADJ. In the exemplary embodiment, the transistors 652 and 672 are N-type transistors, and the impedances 660 and 680 are resistors. Furthermore, the two resistors 660 and 680 have different resistance values. In other words, the impedances 660 and 680 are independent, so as to correspond to the output enable signal OE with different delay degrees.

Furthermore, in the exemplary embodiment, the PWM signal generating circuit 610 comprises an inverter 612, a P-type transistor 614 and an N-type transistor 616. The input terminal of the inverter 612 is configured for receiving a duty-cycle control signal CTL, and the output terminal of the inverter 612 is electrically coupled to the gate terminal of the P-type transistor 614 and the gate terminal of the N-type transistor 616, so as to output an inverted signal of the duty-cycle control signal CTL to the P-type transistor 614 and the N-type transistor 616. A source/drain terminal of the P-type transistor 614 is electrically coupled to a positive-charge pump 620. The positive-charge pump 620 is configured for providing a logic high potential VGH. A source/drain terminal of the N-type transistor 616 is electrically coupled to a negative-charge pump 630. The negative-charge pump 630 is configured for providing a logic low potential VGL. The other source/drain terminal of the N-type transistor 616 is electrically coupled to the other source/drain terminal of the P-type transistor 614. The node Q where the P-type transistor 614 and the N-type transistor 616 are connected to each other is configured for outputting the PWM signal VGP.

Figure 7:
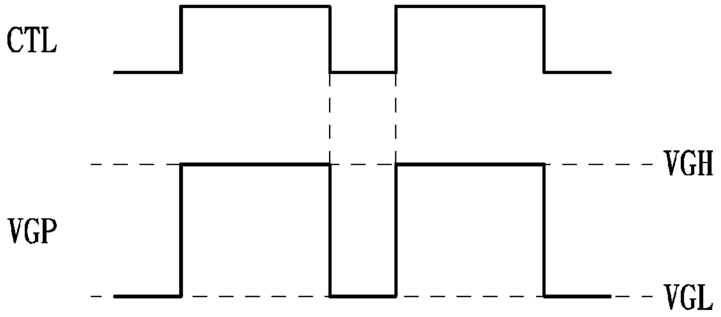
FIG. 7 is a schematic view for showing a time-sequence relation between a duty-cycle control signal and a PWM signal.

FIG. 7 is a schematic view for showing a time-sequence relation between the duty-cycle control signal and the PWM signal. Referring to FIGS. 6 and 7, when the duty-cycle control signal CTL is at the high potential, the P-type transistor 614 is turned on. Thus, the positive-charge pump 620 pulls up the potential of the node Q to the logic high potential VGH through the P-type transistor 614. On the contrary, when the duty-cycle control signal CTL is at the low potential, the N-type transistor 616 is turned on. Thus, the negative-charge pump 630 pulls down the potential of the node Q to the logic low potential VGL through the N-type transistor 616. Therefore, the PWM signal VGP is formed without being shaded. As shown in FIG. 7, the PWM signal VGP has two potentials: the logic high potential VGH and the logic low potential VGL. And the PWM signal VGP has a predetermined duty cycle.

Figure 8:
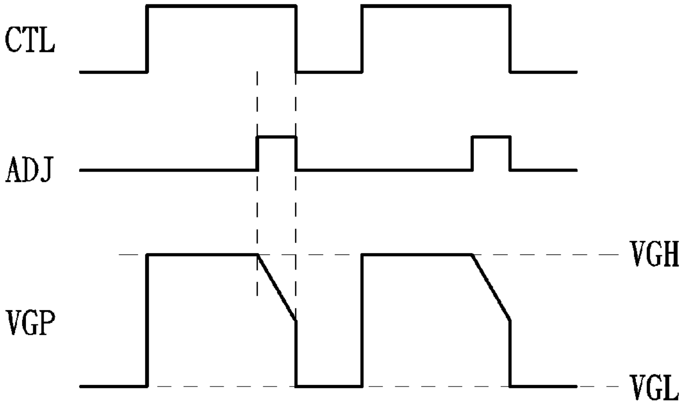
FIG. 8 is a schematic view for showing a time-sequence relation between the duty-cycle control signal, a turn-on control signal and the PWM signal.

Referring to FIG. 6, the circuit as shown in FIG. 6 may employ the turn-on control signal ADJ to control the on/off state of the transistor of each of the scan drivers, so as to perform a shading operation on the PWM signal VGP received by each of the scan drivers. FIG. 8 is a schematic view for showing a time-sequence relation between the duty-cycle control signal, the turn-on control signal and the PWM signal. As shown in FIG. 8, the duty-cycle control signal CTL may be implemented by a first pulse signal, and the turn-on control signal ADJ may be implemented by a second pulse signal. And the two pulse signals have the same frequency. In addition, the initiate time of each pulse of the second pulse signal is behind the initiate time of a corresponding pulse of the first pulse signal, and the end time of each pulse of the second pulse signal is to the same as the end time of a corresponding pulse of the first pulse signal. Referring to FIGS. 6 and 8, the following describes the shading operation for the scan driver 650 as an example. When the turn-on control signal ADJ is at the high potential, the transistor 652 is turned on so that the capacitor 640 can be electrically coupled to the ground potential GND through the transistor 652 and the impedance 660 to discharge the charges of the capacitor 640. Thus, a shaded PWM signal VGP is formed as shown in FIG. 8.

Figure 9:
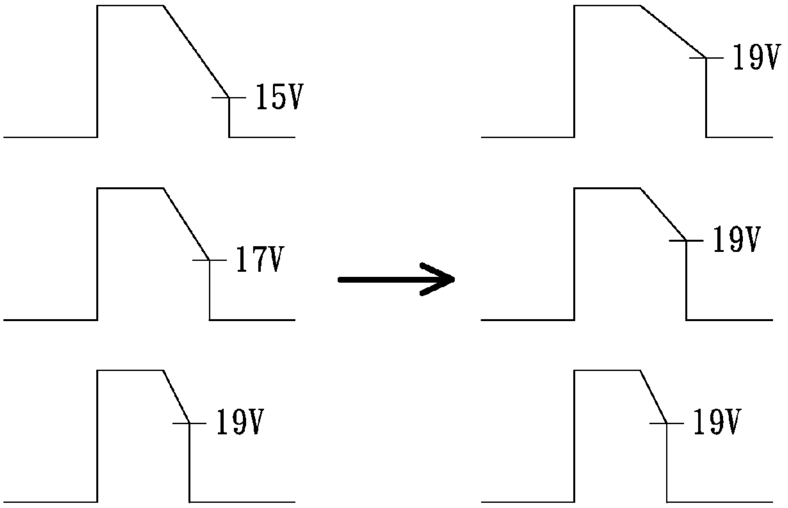
FIG. 9 is a schematic view for showing the difference between the pulse signal of the conventional art and the pulse signal of the present invention.

Therefore, as long as the present invention can suitably define the resistance values of the impedances 660 and 680 according to the delay degrees of the output enable signal OE, the present invention can alter the discharging rate of the capacitor 640. Thus, the scan pulses generated by the scan drivers may be pulled down to the same potential before they are compulsorily pulled down to the logic low potential VGL. FIG. 9 is a schematic view for showing the difference between the pulse signal of the conventional art and the pulse signal of the present invention. In FIG. 9, the three waves at the left of the arrow represent the scan pulses of the conventional art, and the three waves at the right of the arrow represent the scan pulses of the present invention. As shown in FIG. 9, the three scan pulses at the left of the arrow are pulled down from the logic high potential VGH with the same rate. Thus, the scan pulses generated by the scan drivers are pulled down to the different potentials before they are compulsorily pulled down to the logic low potential VGL by the output enable signal OE because of the different delay degrees of the output enable signal OE. However, the three scan pulses at the right of the arrow are pulled down from the logic high potential VGH with different rates. Thus, the scan pulses generated by the scan drivers are pulled to the same potential before they are compulsorily pulled down to the logic low potential VGL by the output enable signal OE even if the output enable signal OE has different delay degrees.

Although the PWM signal generating circuit 610 is implemented by the inverter 610, the P-type transistor 614 and the N-type transistor 616 in the exemplary embodiment, it is understood for persons skilled in the art that the PWM signal generating circuit 610 may also be implemented by the P-type transistor 614 and the N-type transistor 616 as long as the gate terminals of the P-type transistor 614 and the N-type transistor 616 are both electrically coupled to the duty-cycle control signal CTL directly. In addition, although the transistors 652 and 672 are N-type transistors, it is understood for persons skilled in the art that the transistors 652 and 672 may be P-type transistors.

Figure 10:
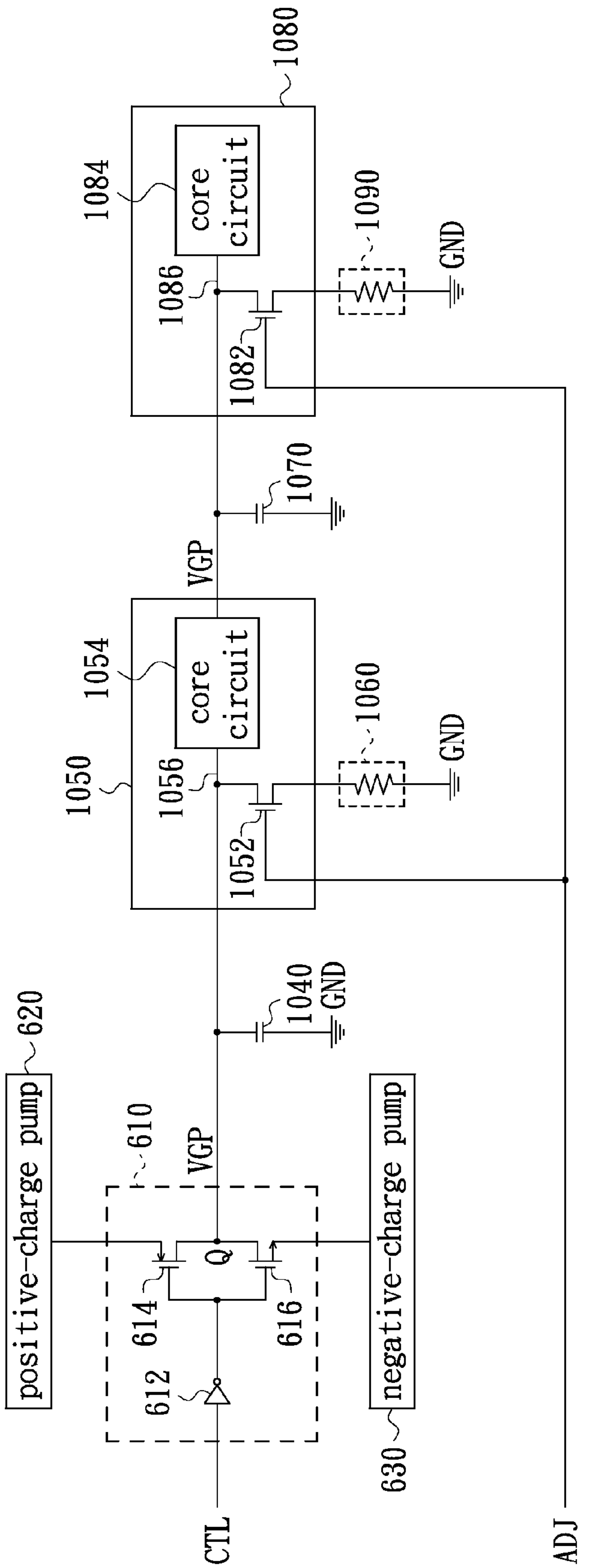
FIG. 10 is a scan-line driving device in accordance with another exemplary embodiment of the present invention.

FIG. 10 is a schematic view of a scan-line driving device in accordance with another exemplary embodiment of the present invention. The scan-line driving device is also suitable for a LCD apparatus. In FIG. 10, the labels which are the same as the labels in FIG. 6 represent the same objects. The scan-line driving device as shown in FIG. 10 is similar to the scan-line driving device as shown in FIG. 6 except that the scan-line driving device as shown in FIG. 10 comprises two capacitors as marked by labels 1040 and 1070. Furthermore, the scan drivers 1050 and 1080 are electrically coupled in series. As shown in FIG. 10, the PWM signal input terminal 1056 of the core circuit 1054 of the scan driver 1050 is electrically coupled to a terminal of the capacitor 1040. A source/drain terminal of the transistor 1052 of the scan driver 1050 is electrically coupled to the PWM signal input terminal 1056 and a terminal of the capacitor 1056, the other source/drain terminal of the transistor 1052 is electrically coupled to the ground potential GND through the impedance 1060, and the gate terminal of the transistor 1052 is configured for receiving the turn-on control signal ADJ.

The PWM signal input terminal 1086 of the core circuit 1084 of the scan driver 1080 is electrically coupled to a terminal of the capacitor 1070. A source/drain terminal of the transistor 1082 of the scan driver 1080 is electrically coupled to the PWM signal input terminal 1086 and a terminal of the capacitor 1070, the other source/drain terminal of the transistor 1082 is electrically coupled to the ground potential GND through the impedance 1090, and the gate terminal of the transistor 1082 is also configured for receiving the turn-on control signal ADJ. In the exemplary embodiment, the transistors 1052 and 1082 are N-type transistors, and the impedances 1060 and 1090 are resistors. Furthermore, the two resistors have different resistance values, so as to correspond to the different delay degrees of the output enable signal OE.

In addition, in the scan-line driving device as shown in FIG. 10, the core circuit 1054 of the scan driver 1050 further transmits the received PWM signal VGP to the core circuit 1084 of the scan driver 1080, so that the scan driver 1080 can perform a shading operation on the received PWM signal.

The present invention further provides a driving method for a scan-line driving device of a LCD apparatus. The driving method comprises the following steps: outputting a PWM signal with a first potential and a second potential to a first scan driver and a second scan driver, wherein the first scan driver comprises a first core circuit and a first transistor, the second scan driver comprises a second core circuit and a second transistor, and the PWM signal further has a predetermined duty cycle; and receiving a turn-on control signal to turn on the first transistor and the second transistor for performing a shading operation on the PWM signal by a first impedance and a second impedance, so as to generate a shaded PWM signal, wherein the resistance value of the first impedance is set different from that of the second impedance according to delay degrees of an output enable signal outputting to the first core circuit and the second core circuit.

In summary, the present invention adds a transistor to each of the scan drivers. A source/drain terminal of a transistor is electrically coupled to the PWM signal input terminal of the core circuit of a corresponding one of the scan drivers and is electrically coupled to the ground potential through an external capacitor, and the other source/drain terminal of the transistor is electrically coupled to the ground potential through an external resistor. In addition, the present invention further provides a PWM signal with a logic high potential and a logic low potential to the node where an external capacitor and a corresponding transistor are coupled to each other, and the invention uses a turn-on control signal to control the on/off state of each transistor, so as to perform a shading operation on the PWM signals received by the scan drivers respectively. Therefore, as long as the present invention can suitably define the resistance values of the external resistors according to the delay degree of the output enable signal, the present invention can alter the discharging rate of the external capacitors. Thus, the scan pulses generated by the scan drivers may be pulled down to the same potential before they are compulsorily pulled down to the logic low potential VGL by the output enable signal OE.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scan-line driving device for a LCD apparatus, comprising:

a PWM signal generating circuit configured for outputting a PWM signal with a first potential and a second potential, the PWM signal further having a predetermined duty cycle;

a first impedance having a first terminal and a second terminal;

a second impedance having a first terminal and a second terminal, the resistance value of the second impedance being different from that of the first impedance, and the first terminal of the second impedance and the first terminal of the first impedance being both electrically coupled to a ground potential;

a capacitor having a first terminal and a second terminal, the first terminal of the capacitor being electrically coupled to the ground potential;

a first scan driver comprising a first core circuit and a first transistor, the first core circuit having a first PWM signal input terminal, the first transistor having a first source/drain terminal, a second source/drain terminal and a gate terminal, the first source/drain terminal of the first transistor being electrically coupled to the first PWM signal input terminal and the second terminal of the capacitor, the second source/drain terminal of the first transistor being electrically coupled to the second terminal of the first impedance, and the gate terminal of the first transistor being configured for receiving a turn-on control signal; and a second scan driver comprising a second core circuit and a second transistor, the second core circuit having a second PWM signal input terminal, the second transistor having a first source/drain terminal, a second source/drain terminal and a gate terminal, the first source/drain terminal of the second transistor being electrically coupled to the second PWM signal input terminal and the second terminal of the capacitor, the second source/drain terminal of the second transistor being electrically coupled to the second terminal of the second impedance, and the gate terminal of the second transistor being configured for receiving the turn-on control signal;

wherein the PWM signal generating circuit comprises:

a P-type transistor having a first source/drain terminal, a second source/drain terminal and a gate terminal, the first source/drain terminal of the P-type transistor being electrically coupled to a positive-charge pump, and the gate terminal of the P-type transistor being configured for receiving duty-cycle control signal; and a N-type transistor having a first source/drain terminal, a second source/drain terminal and a gate terminal, the first source/drain terminal of the N-type transistor being electrically coupled to a negative-charge pump, the second source/drain terminal of the N-type transistor being electrically coupled to the second source/drain terminal of the P-type transistor and configured for outputting the PWM signal, and the gate terminal of the N-type transistor being configured for receiving the duty-cycle control signal;

an inverter electrically coupled between the gate terminal of the P-type transistor and the duty-cycle control signal and between the gate terminal of the N-type transistor and the duty-cycle control signal, the inverter having an input terminal and an output terminal, the input terminal of the inverter being configured for receiving the duty-cycle control signal, and the output terminal of the inverter being configured for outputting an inverted signal of the duty-cycle control signal.

2. The scan-line driving device according to claim 1, wherein the first potential is larger than the second potential, the duty-cycle control signal and the turn-on control signal are a first pulse signal and a second pulse signal respectively, the first pulse signal and the second pulse signal have the same frequency, the initiate time of each pulse of the second pulse signal is behind the initiate time of a corresponding pulse of the first pulse signal, and the end time of each pulse of the second pulse signal is the same as the end time of a corresponding pulse of the first pulse signal.

3. The scan-line driving device according to claim 1, wherein the first transistor and the second transistor are N-type transistors or P-type transistors.

4. A scan-line driving device for a LCD apparatus, comprising:

a PWM signal generating circuit configured for outputting a PWM signal with a first potential and a second potential, the PWM signal further having a predetermined duty cycle;

a first impedance having a first terminal and a second terminal;

a second impedance having a first terminal and a second terminal, the resistance value of the second impedance being different from that of the first impedance, and the first terminal of the second impedance and the first terminal of the first impedance being both electrically coupled to a ground potential;

a first capacitor having a first terminal and a second terminal, the first terminal of the first capacitor being electrically coupled to the ground potential;

a second capacitor having a first terminal and a second terminal, the first terminal of the second capacitor being electrically coupled to the ground potential;

a first scan driver comprising a first core circuit and a first transistor, the first core circuit having a first PWM signal input terminal, the first transistor having a first source/drain terminal, a second source/drain terminal and a gate terminal, the first source/drain terminal of the first transistor being electrically coupled to the first PWM signal input terminal and the second terminal of the first capacitor, the second source/drain terminal of the first transistor being electrically coupled to the second terminal of the first impedance, and the gate terminal of the first transistor being configured for receiving a turn-on control signal; and a second scan driver comprising a second core circuit and a second transistor, the second core circuit having a second PWM signal input terminal, the second transistor having a first source/drain terminal, a second source/drain terminal and a gate terminal, the first source/drain terminal of the second transistor being electrically coupled to the second PWM signal input terminal and the second terminal of the second capacitor, the second source/drain terminal of the second transistor being electrically coupled to the second terminal of the second impedance, and the gate terminal of the second transistor being configured for receiving the turn-on control signal;

wherein the PWM signal generating circuit comprises:

a P-type transistor having a first source/drain terminal, a second source/drain terminal and a gate terminal, the first source/drain terminal of the P-type transistor being electrically coupled to a positive-charge pump, and the gate terminal of the P-type transistor being configured for receiving duty-cycle control signal; and a N-type transistor having a first source/drain terminal, a second source/drain terminal and a gate terminal, the first source/drain terminal of the N-type transistor being electrically coupled to a negative-charge pump, the second source/drain terminal of the N-type transistor being electrically coupled to the second source/drain terminal of the P-type transistor, and the gate terminal of the N-type transistor being configured for receiving the duty-cycle control signal;

an inverter electrically coupled between the gate terminal of the P-type transistor and the duty-cycle control signal and between the gate terminal of the N-type transistor and the duty-cycle control signal, the inverter having an input terminal and an output terminal, the input terminal of the inverter being configured for receiving the duty-cycle control signal, and the output terminal of the inverter being configured for outputting an inverted signal of the duty-cycle control signal.

5. The scan-line driving device according to claim 4, wherein the first potential is larger than the second potential, the duty-cycle control signal and the turn-on control signal are a first pulse signal and a second pulse signal respectively, the first pulse signal and the second pulse signal have the same frequency, the initiate time of each pulse of the second pulse signal is behind the initiate time of a corresponding pulse of the first pulse signal, and the end time of each pulse of the second pulse signal is the same as the end time of a corresponding pulse of the first pulse signal.

6. The scan-line driving device according to claim 4, wherein the first transistor and the second transistor are N-type transistors or P-type transistors.

7. A driving method for a scan-line driving device of a LCD apparatus, comprising:

outputting a PWM signal with a first potential and a second potential to a first scan driver and a second scan driver, wherein the first scan driver comprises a first core circuit and a first transistor, the second scan driver comprises a second core circuit and a second transistor, and the PWM signal further has a predetermined duty cycle; and receiving a turn-on control signal to turn on the first transistor and the second transistor for performing a shading operation on the PWM signal by a first impedance and a second impedance, so as to generate a shaded PWM signal, wherein the resistance value of the first impedance is set different from that of the second impedance according to delay degrees of an output enable signal outputting to the first core circuit and the second core circuit respectively;

wherein the PWM signal is outputted from a PWM signal generating circuit, and the PWM signal generating circuit comprises:

a P-type transistor having a first source/drain terminal, a second source/drain terminal and a gate terminal, the first source/drain terminal of the P-type transistor being electrically coupled to a positive-charge pump, and the gate terminal of the P-type transistor being configured for receiving duty-cycle control signal; and a N-type transistor having a first source/drain terminal, a second source/drain terminal and a gate terminal, the first source/drain terminal of the N-type transistor being electrically coupled to a negative-charge pump, the second source/drain terminal of the N-type transistor being electrically coupled to the second source/drain terminal of the P-type transistor, and the gate terminal of the N-type transistor being configured for receiving the duty-cycle control signal;

an inverter electrically coupled between the gate terminal of the P-type transistor and the duty-cycle control signal and between the gate terminal of the N-type transistor and the duty-cycle control signal, the inverter having an input terminal and an output terminal, the input terminal of the inverter being configured for receiving the duty-cycle control signal, and the output terminal of the inverter being configured for outputting an inverted signal of the duty-cycle control signal.

* * * * *